United States Patent
Fukui et al.

(10) Patent No.: US 9,909,539 B2
(45) Date of Patent: Mar. 6, 2018

(54) PRESSURE CONTROL APPARATUS OF FUEL TANK FOR VEHICLE

(71) Applicant: TOYOTA JIDOSHA KABUSHIKI KAISHA, Toyota-shi, Aichi-ken (JP)

(72) Inventors: Keita Fukui, Fujinomiya (JP); Yusaku Nishimura, Toyota (JP); Tatsuhiko Akita, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/972,798

(22) Filed: Dec. 17, 2015

(65) Prior Publication Data

US 2016/0186699 A1    Jun. 30, 2016

(30) Foreign Application Priority Data

Dec. 25, 2014  (JP) .................................. 2014-262064
Jul. 23, 2015  (JP) .................................. 2015-145564

(51) Int. Cl.
  *F02M 25/08*      (2006.01)
  *B60K 15/035*     (2006.01)

(52) U.S. Cl.
  CPC ....... *F02M 25/0836* (2013.01); *B60K 15/035* (2013.01); *B60K 15/03519* (2013.01); *B60K 2015/0358* (2013.01)

(58) Field of Classification Search
  CPC .............. F02M 25/0836; B60K 15/035; B60K 15/03519; B60K 2015/0358
  USPC ......................................................... 123/520
  See application file for complete search history.

(56) References Cited

U.S. PATENT DOCUMENTS

| 5,327,934 A | 7/1994 | Thompson |
| 7,409,947 B2 | 8/2008 | Koyama |
| 7,950,375 B2 | 5/2011 | Wang et al. |
| 8,528,528 B2 * | 9/2013 | Fukui .................... F02M 25/08 123/516 |
| 2005/0098157 A1 * | 5/2005 | Ohtani ................ F02D 41/3029 123/431 |
| 2009/0025694 A1 | 1/2009 | Shinagawa et al. |

(Continued)

FOREIGN PATENT DOCUMENTS

| JP | S5690013 U | 7/1981 |
| JP | 2001-107814 A | 4/2001 |

(Continued)

*Primary Examiner* — Joseph Dallo
*Assistant Examiner* — Yi-Kai Wang
(74) *Attorney, Agent, or Firm* — Finnegan, Henderson, Farabow, Garrett & Dunner, LLP

(57) ABSTRACT

In pressure increasing control for raising a pressure within a sealed type fuel tank from an excessive negative pressure to a low negative pressure, an opening or closing operation of a sealing valve, when the interior of a vehicle is very quiet, may cause the working noise thereof to be transmitted to a passenger, thereby deteriorating the noise characteristic. When the pressure within a fuel tank is below a predetermined negative pressure near a saturated vapor pressure of the fuel and an interior noise level is equal to or greater than a threshold value, a controller may operate a sealing valve to thereby raise the pressure of the fuel tank to a normal negative pressure region which may be higher than the predetermined negative pressure.

2 Claims, 6 Drawing Sheets

(56) References Cited

U.S. PATENT DOCUMENTS

| | | | |
|---|---|---|---|
| 2009/0308359 A1* | 12/2009 | Wang | F02M 25/0836 123/520 |
| 2010/0294251 A1* | 11/2010 | Makino | F02M 25/0836 123/519 |
| 2011/0148185 A1* | 6/2011 | Okano | B60T 8/3655 303/6.01 |
| 2011/0253110 A1 | 10/2011 | Fukui | |
| 2012/0130596 A1 | 5/2012 | Ooiwa | |
| 2012/0186333 A1* | 7/2012 | Nishimura | F02M 25/0809 73/40.5 R |
| 2013/0096774 A1 | 4/2013 | Takata | |
| 2013/0297177 A1* | 11/2013 | Kim | F02M 25/0809 701/102 |
| 2014/0303823 A1* | 10/2014 | Nakanishi | B60K 6/48 701/22 |
| 2015/0025739 A1* | 1/2015 | Wakairo | F16H 61/0025 701/36 |
| 2015/0239464 A1* | 8/2015 | Ando | B60W 20/17 701/22 |
| 2017/0184058 A1* | 6/2017 | Miyata | F02M 25/0818 |

FOREIGN PATENT DOCUMENTS

| | | |
|---|---|---|
| JP | 2009-215909 A | 9/2009 |
| JP | 2010-242723 | 10/2010 |
| JP | 4800271 | 10/2011 |
| JP | 5282916 | 9/2013 |

\* cited by examiner

PRESSURE CONTROL APPARATUS OF FUEL TANK FOR VEHICLE

CROSS REFERENCE TO RELATED APPLICATION

This application claims priority to Japanese Patent Application No. 2014-262064 filed on Dec. 25, 2014, and Japanese Patent Application No. 2015-145564 filed on Jul. 23, 2015, which are incorporated herein by reference in their entirety.

Technical Field

The present disclosure relates to a pressure control apparatus of a sealing type fuel tank for a vehicle.

BACKGROUND

Description of Background Art

An increase in the internal pressure of a sealed type fuel tank installed in a vehicle to an atmospheric pressure or higher, due to a temperature rise and the like, may cause a possibility that evaporated fuel within the fuel tank will be emitted to the atmosphere through a refueling port at the time of refueling. As the evaporated fuel contains hydrocarbons which are main substances responsible for photochemical smog, discharge of the evaporated fuel is often regulated under rules and regulations (so-called evaporative emission regulations).

In order to prevent emission of the evaporated fuel into the air, it may be necessary to maintain the tank internal pressure at a negative pressure (less than atmospheric pressure). For the purpose of controlling the tank internal pressure, a vehicle may include a pressure control apparatus provided therein. This control apparatus, which is also referred to as an evaporated fuel discharge suppression apparatus, may be provided with a mechanism which is capable of adjusting the tank internal pressure while preventing emission of the evaporated fuel into the air.

A pressure control apparatus may include an evaporation pipe connected to a fuel tank, and a purge pipe coupling the evaporation pipe and an intake passage of an internal combustion engine. When the pressure of the intake passage reaches a negative pressure in association with driving of the internal combustion engine, the evaporated fuel in the fuel tank may be drawn through the evaporation pipe and the purge pipe so that the internal pressure of the fuel tank can be decreased to a negative pressure (less than the atmospheric pressure). The evaporated fuel drawn into the intake passage may be burned in the internal combustion engine and can therefore be prevented from being discharged into the air.

A sealing valve may be mounted to the evaporation pipe to perform an opening or closing operation in accordance with the tank internal pressure. JP 4800271 B2, for example, discloses that when the internal pressure of the fuel tank reaches a predetermined value, a sealing valve may be opened to place an evaporation pipe into a communicating state. JP 5282916 B2 discloses that, in order to avoid damage of the fuel tank at the time of collision of the vehicle, a sealing valve may be opened when the acceleration of the vehicle is equal to or greater than a predetermined acceleration threshold and also the fuel tank internal pressure is greater than the atmospheric pressure.

The pressure control of a fuel tank may include not only pressure reducing control for reducing the tank internal pressure from a pressure which is equal to or greater than the atmospheric pressure to a negative pressure, but also pressure increasing control (restoring control from excessive negative pressure) for raising the tank internal pressure from a negative pressure which is excessive (excessive negative pressure) to a normal negative pressure (low negative pressure). When the fuel tank internal pressure is reduced in an excessive manner due to fuel consumption, temperature decrease, and the like, to cause the fuel to reach a saturated vapor pressure, the fuel may be substantially in a state of flash boiling. This may cause the evaporated fuel (fuel gas) to enter a fuel pump and prevent fuel supply, which is referred to as "vapor lock." In this case, a sealing valve may be opened to draw air into the fuel tank, and thereby may raise the tank internal pressure from the excessive negative pressure (approximately the saturated vapor pressure of the fuel) to the normal negative pressure.

As in the pressure increasing control, it is possible to increase the pressure simply by drawing air into the fuel tank having a negative pressure. The timing for executing the pressure increasing control is not limited to when the pressure of the intake passage is negative, that is, when internal combustion engine is driven, which is different from the pressure reducing control. It is possible to determine whether or not the pressure increasing control can be carried out simply by monitoring the internal pressure of the fuel tank regardless of whether the internal combustion engine is being driven or not.

SUMMARY

The vehicle interior is sometimes very quiet when the internal combustion engine is stopped, that is, in the absence of engine noise. During a halt of the internal combustion engine, the pressure within the fuel tank may not be reduced due to fuel consumption, but may be reduced by a temperature decrease. This corresponds to a case in which a hybrid vehicle and the like, for example, travels in a low-temperature environment, such as a cold district, during execution of an electric vehicle (EV) driving mode in which a driving force is obtained only from a rotary electric machine. If the pressure increasing control is executed in such a state, working noise of the sealing valve may be transmitted to a passenger, which may further deteriorate the so-called noise characteristic. Embodiments of the present disclosure may provide a pressure control apparatus of a fuel tank for a vehicle, which can prevent deterioration of the noise characteristic with respect to a passenger at the time of execution of the pressure increasing control.

Embodiments of the present disclosure may provide a pressure control apparatus of a fuel tank for a vehicle for controlling a negative pressure of a sealing type fuel tank provided in a vehicle and maintained under a negative pressure. The control apparatus may include an air introduction passage having one end connected to the fuel tank and the other end being opened to outside air, a sealing valve configured to open and close the air introduction passage, and a controller, such as a control unit, configured to control an opening and closing operation of the sealing valve. The control unit, when a pressure of the fuel tank is below a predetermined negative pressure and an interior noise level is equal to or greater than a threshold value, may operate the sealing valve to raise the pressure of the fuel tank to a pressure in a normal negative pressure region which is higher than the predetermined negative pressure.

In the pressure control apparatus, the control unit may determine that the interior noise level is equal to or greater than the threshold value when a rotation rate of an internal combustion engine of the vehicle is equal to or greater than a predetermined value.

In the pressure control apparatus, the control unit may determine that the interior noise level is equal to or greater than the threshold value when a rotation rate of a rotary electric machine of the vehicle is equal to or greater than a predetermined value.

In the pressure control apparatus, the control unit may determine that the interior noise level is equal to or greater than the threshold value when a vehicle speed is equal to or greater than a predetermined value.

In the pressure control apparatus, the control unit may determine that the interior noise level is equal to or greater than the threshold value when a rotation rate of an air conditioning blower motor of the vehicle is equal to or greater than a predetermined value.

In the pressure control apparatus, the control unit may determine that the interior noise level is equal to or greater than the threshold value when a sound volume of an audio system of the vehicle is equal to or greater than a predetermined value.

In the pressure control apparatus, the control unit may operate the sealing valve when a sum of the interior noise level corresponding to each of the rotation rate of the internal combustion engine, the rotation rate of the rotary electric machine, the vehicle speed, the rotation rate of the air conditioner blower motor, and the sound volume of the audio system of the vehicle is equal to or greater than the threshold value.

According to the present disclosure, at the time of execution of pressure increasing control for raising the fuel tank internal pressure from an excessive negative pressure to a normal negative pressure, deterioration of noise characteristic with respect to a passenger can be prevented.

BRIEF DESCRIPTION OF THE DRAWINGS

Embodiments of the present disclosure will be described based on the following figures, wherein.

DETAILED DESCRIPTION OF EMBODIMENTS

Embodiments of the present disclosure will be described in detail with reference to the accompanying drawings.

Figure 1:
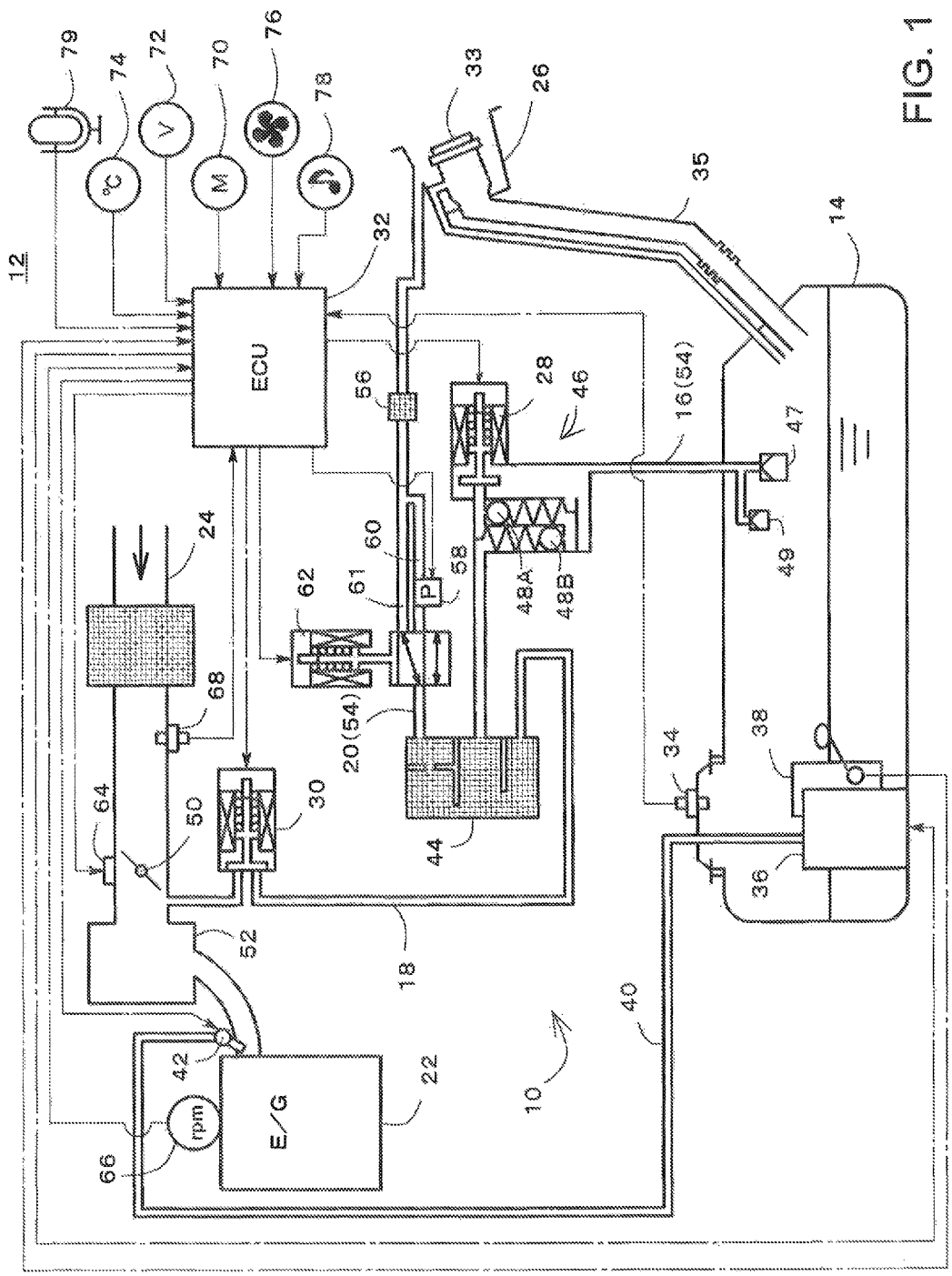
FIG. 1 is a diagram illustrating a structure of a vehicle including a pressure control apparatus according to a present embodiment mounted therein.

FIG. 1 illustrates a structure of a vehicle 12 including a pressure control apparatus 10 according to a present embodiment mounted therein. FIG. 1 shows only a structure related to the pressure control apparatus 10, which is extracted from the structure of the vehicle 12. In FIG. 1, a dashed and single-dotted line indicates a signal line.

The pressure control apparatus 10 is also referred to as an evaporated fuel discharge suppression apparatus, and comprises an evaporation pipe 16 connected to a fuel tank 14, a purge pipe 18 which is separated from the evaporation pipe 16, and a vent pipe 20. The purge pipe 18 is connected to an intake passage 24, which is in communication with an internal combustion engine 22. The vent pipe 20 is connected to a fuel inlet box 26 and opened to outside air.

A sealing valve 28 is provided on the evaporation pipe 16, and a purge valve 30 is provided on the purge pipe 18. The opening and closing operations of these valves are controlled by a control unit 32.

The pressure control apparatus 10 performs negative pressure control of the fuel tank 14. The negative pressure control includes pressure reducing control and pressure increasing control. In the pressure reducing control, the internal pressure (tank pressure) of the fuel tank 14, which has been raised to the atmospheric pressure or higher, is reduced to a predetermined normal negative pressure. In the pressure increasing control, the internal pressure (tank pressure) of the fuel tank 14, which has reached an excessive negative pressure, is increased to a normal negative pressure.

The pressure reducing control is performed when the internal combustion engine 22 is being driven and the intake passage 24 has a negative pressure. When the sealing valve 28 and the purge valve 30 are opened in accordance with an instruction from the control unit 32, the evaporated fuel in the fuel tank 14 is drawn, via the evaporation pipe 16 and the purge pipe 18, into the intake passage 24. The evaporated fuel, which has been drawn in, is burned in the internal combustion engine 22. When the internal pressure of the fuel tank 14 reaches a predetermined normal negative pressure, the sealing valve 28 and the purge valve 30 are closed.

Under the pressure increasing control, in accordance with an instruction from the control unit 32, the sealing valve 28 is opened. This allows air to be drawn into the fuel tank 14 via the vent pipe 20 and the evaporation pipe 16. When the internal pressure in the fuel tank 14 reaches a predetermined normal negative pressure, the sealing valve 28 is closed.

As will be described below, in the pressure increasing control, the control unit 32 operates (opens or closes) the sealing valve 28 when an interior noise level is equal to or higher than a predetermined value. This structure can reduce transmission of the working noise of the sealing valve 28 to a vehicle interior, so that deterioration of the noise characteristic with respect to a passenger can be suppressed.

The fuel tank 14 is a sealed type pressure-resistant tank and can be formed of a metal or resin tank. As described above, in order to prevent the evaporated fuel from being discharged to the air, the internal pressure in the fuel tank 14 is held to a negative pressure (which is less than the atmospheric pressure). The fuel tank 14 is connected to a refueling pipe 35 having a refueling port 33 at an end thereof. The fuel tank 14 also includes a tank internal pressure sensor 34, a fuel pump 36, and a fuel gauge 38.

The fuel pump 36 supplies fuel, via a fuel supply pipe 40, to an injector 42. The fuel pump 36 is formed of a positive displacement pump of a periphery type or the like, for example. The fuel gauge 38 measures the remaining fuel amount within the fuel tank 14, and is formed of a float type center gauge.

The tank internal pressure sensor 34 measures the internal pressure within the fuel tank 14, and is formed of a diaphragm type pressure sensor. Measured values from the tank internal pressure sensor 34 are supplied to the control unit 32. With the tank internal pressure sensor 34, not only can the internal pressure within the fuel tank 14 be recognized but, also leakage of the evaporated fuel caused by a partial damage of the fuel tank 14 can be sensed.

The pressure control apparatus 10 is a pressure controller for maintaining the internal pressure of the fuel tank 14 at negative pressure, and includes the evaporation pipe 16, the vent pipe 20, the purge pipe 18, a canister 44, a valve unit 46, and the control unit 32.

The evaporation pipe 16 has one end connected to the fuel tank 14 and the other end connected to the canister 44. The evaporation pipe 16 functions as a passage for the evaporated fuel within the fuel tank 14 at the time of the pressure reducing control of the fuel tank 14.

An ORVR valve 47 (Onboard Refueling Vapor Recovery Valve) and an RO valve 49 (Roll Over Valve) are provided on the end of the evaporation pipe 16 closer to the fuel tank 14. The ORVR valve 47 and the RO valve 49 are formed of a float valve, for example. Both the ORVR valve 47 and the RO valve 49 are normally in an opened state, and are closed when the surface level of the fuel tank 14 is high. The closed state of the valves prevents discharge of the fuel to the air through the evaporation pipe 16 when the vehicle 12 overturns.

The valve unit 46 is provided on the evaporation pipe 16 for switching the evaporation pipe 16 between a communicating state and a blocked state. The valve unit 46 includes the sealing valve 28 and relief valves 48A and 48B.

The sealing valve 28 is opened or closed in accordance with an opening instruction/closing instruction of the control unit 32, and can be formed of an electromagnetic valve such as a solenoid valve, for example. The opening and closing operations of the sealing valve 28 may cause working noise. When opening the valve, for example, noise may be generated based on a difference in pressure between the upstream side and the downstream side of the sealing valve 28. When closing the valve, current supply to the solenoid valve can be blocked to urge a plunger to a seating surface by an elastic force of a spring, and can thereby generate a so-called seating sound. As will be described below, the pressure control apparatus 10 according to the present embodiment performs opening and closing operations of the sealing valve 28 in accordance with the interior noise level, and thereby may prevent transmission of the working noise of the valve to the vehicle interior.

The relief valves 48A and 48B are provided so as to compulsorily eliminate pressure abnormalities in the evaporation pipe 16 at the time of failure of the sealing valve 28. The relief valves 48A and 48B are normally in a closed state, and are configured to be opened when a pressure of a predetermined value or greater is applied to a spring provided in the relief valves 48A and 48B. One of the two relief valves 48A and 48B, the valve 48A, is configured to be opened if the pressure is higher on the canister 44 side than on the fuel tank 14 side. The other valve 48B is configured to be opened when the pressure on the fuel tank 14 side is greater on the canister 44 side.

The canister 44 is an adsorption unit for adsorbing the evaporated fuel, and is provided at a point where the evaporation pipe 16 diverges into the vent pipe 20 and the purge pipe 18. When the pressure of a fuel tank 14 is high while the internal combustion engine 22 is stopped, for example, the sealing valve 28 is opened to allow the vent pipe 20 to communicate with the fuel tank 14. The evaporated fuel discharged from the fuel tank 14 at this time is adsorbed to the canister 44.

While the internal combustion engine 22 is being driven, the purge valve 30 is opened to allow the evaporated fuel adsorbed to the canister 44 to be desorbed and drawn into the intake passage 24. As a result, the adsorption ability of the canister 44 can be recovered.

The purge pipe 18 has one end connected to the canister 44 and the other end connected to the intake passage 24. The purge pipe 18 is connected to the intake passage 24 at a point between a throttle valve 50 and a surge tank 52, for example.

The purge valve 30 is provided on the purge pipe 18 for switching the purge pipe 18 between a communicating state and a blocked state. The purge vale 30, similar to the sealing valve 28, can be formed, for example, of an electromagnetic valve such as a solenoid valve.

The vent pipe 20 has one end connected to the canister 44 and the other end connected to a fuel inlet box 26 and opened to the air. The vent pipe 20 and the evaporation pipe 16 together form an air introduction passage 54 including one end connected to the fuel tank 14 and the other end opened to the air.

The vent pipe 20 system includes an air filter 56, a vacuum pump 58, a normal pipe 61, a bypass pipe 60, and a switching valve 62 provided thereon. The air filter 56 can adsorb dust in air when the air is introduced. The vacuum pump 58 is provided on the bypass pipe 60 and is driven during the pressure reducing control, to thereby allow the air to be actively transported to the canister 44, so that desorption of the evaporated fuel adsorbed to the canister 44 can be accelerated.

The switching valve 62 is provided for switching the air passage in the vent pipe 20. During the pressure reducing control described above, for example, (with the vacuum pump 58 being driven) the switching valve 62 allows the air to be introduced through the bypass pipe 60, and during the pressure increasing control, (with the vacuum pump 58 being not driven) the switching valve 62 can allow the air to be introduced through the normal pipe 61, not through the bypass pipe 60. The switching valve 62 is formed of an electromagnetic valve such as a solenoid valve, for example, and places the bypass pipe 60 in the communicating state when a current is supplied (valve opened state) and places the normal pipe 61 in the communicating state when current supply is blocked (closed state).

The control unit 32 performs the pressure increasing control which will be described below and various other operation controls for the vehicle 12. The control unit 32 may be formed of a computer, and incorporates a CPU, a memory unit, and a device/sensor interface, which are connected with each other via an internal bus.

The memory unit in the control unit 32 stores a program for executing the pressure increasing control which will be described below, set values for executing the control, and the like. The memory unit may also store a vehicle interior noise map which correlates driving statuses of the vehicle 12 with the vehicle interior noise. By causing the CPU to execute these maps and programs, a computer functions as the control unit 32 which executes the pressure increasing control which will be described below.

Figure 4:
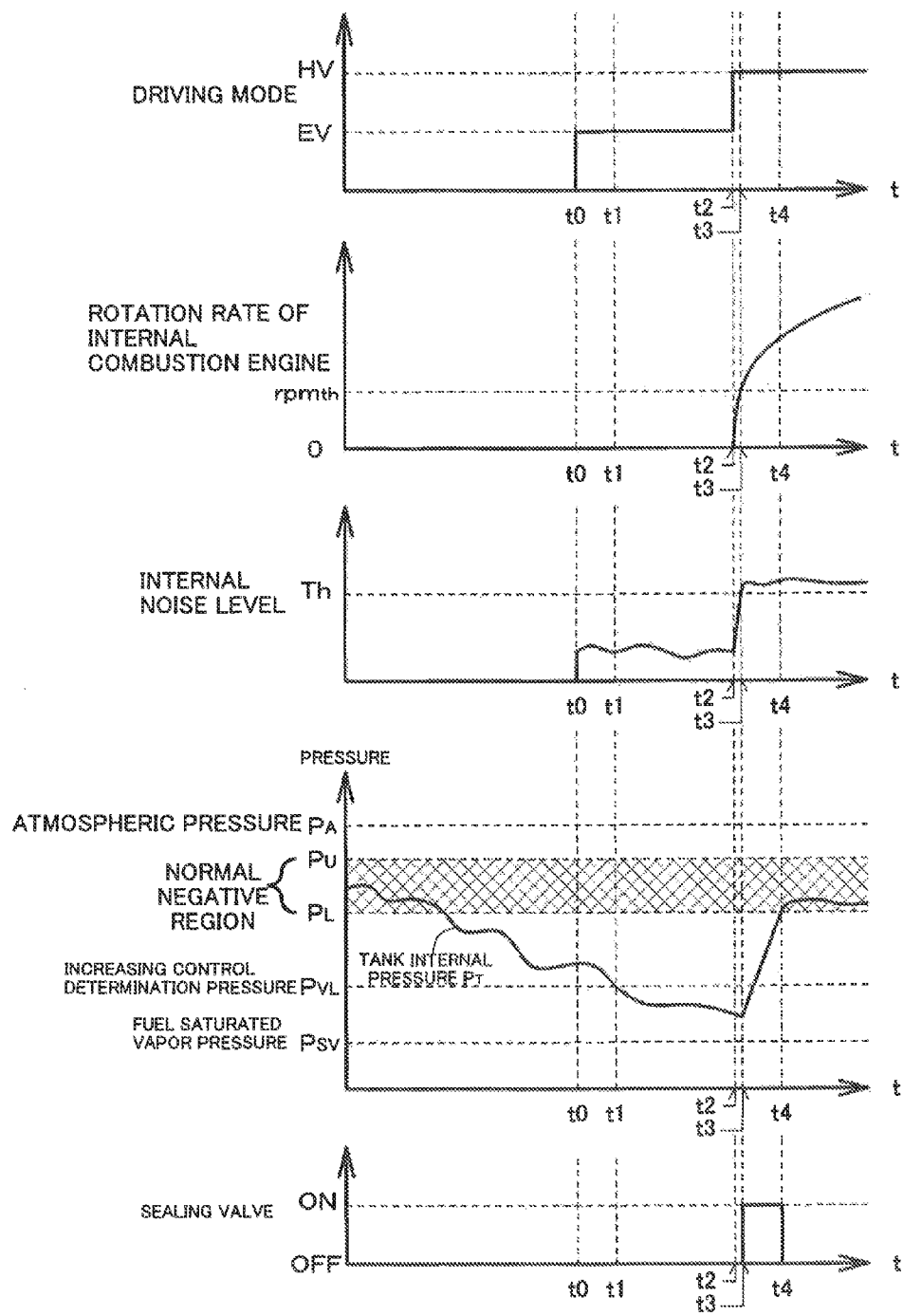
FIG. 4 is a time chart for explaining pressure increasing control based on a rotation rate of an internal combustion engine.

The set values stored in the memory unit include an upper limit value $P_U$ and a lower limit value $P_L$ of the normal negative pressure region, a fuel saturated vapor pressure $P_{SV}$, and a pressure increasing control determination pressure $P_{VL}$, as illustrated in FIG. 4, for example.

The normal negative pressure region ($P_L$ to $P_U$) is a target value of the internal pressure of the fuel tank 14, and is set to a so-called low negative pressure region which is slightly lower than the atmospheric pressure $P_A$. More specifically, the normal negative pressure region is set to a negative pressure at which it is possible to prevent the evaporated fuel within the fuel tank 14 from being discharged from the refueling port 33 at the time of refueling.

The pressure increasing control determination pressure $P_{VL}$ is a pressure value which is one of various triggers for executing the pressure increasing control, and a region in which the internal pressure $P_T$ in the fuel tank 14 is below the pressure increasing control determination pressure $P_{VL}$ ($P_T \leq P_{VL}$) is a region for carrying out the pressure increasing control. As the pressure increasing control is intended for preventing the internal pressure of the fuel tank 14 from being equal to or less than the saturated vapor pressure $P_{SV}$ of the fuel and thus preventing flash boiling of the fuel as described above, the pressure increasing control determination pressure $P_{VL}$ may be set to a value near the saturated vapor pressure $P_{SV}$ of the fuel. More specifically, the pressure increasing control determination pressure $P_{VL}$ may be set to be within a range of values which are equal to or greater than the saturated vapor pressure $P_{SV}$ of the fuel and below the lower limit value $P_L$ of the normal negative pressure region.

Referring back to FIG. 1, the control unit 32, for executing the pressure increasing control, transmits an instruction signal for instructing opening and closing to the sealing valve 28. The control unit 32, for executing the pressure reducing control, also transmits an instruction signal for instructing opening and closing to the sealing valve 28 and the purge valve 30 and transmits an instruction signal for instructing switching between the normal pipe 61 and the bypass pipe 60 to the switching valve 62. The control unit 32 further transmits a driving instruction to the vacuum pump 58.

The control unit 32 further transmits a driving instruction to a throttle motor 64 to adjust the degree of opening of a throttle valve 50. The control unit 32 also transmits a driving instruction to the fuel pump 36 to adjust an amount of fuel supply to the injector 42.

The control unit 32 also receives signals from various sensors via the device/sensor interface. The control unit 32 receives, as a signal concerning the fuel tank 14, the internal pressure of the fuel tank 14 from the tank internal pressure sensor 34. The control unit 32 further receives an amount of residual fuel content from the fuel gauge 38.

The control unit 32 further receives, as information concerning the saturated vapor pressure $P_{SV}$ of the fuel, an outside-air temperature from an outside-air sensor 74. As the saturated vapor pressure $P_{SV}$ of the fuel varies depending on the temperature, the control unit 32 can change the saturated vapor pressure $P_{SV}$ of the fuel in accordance with the outside-air temperature which is received.

The control unit 32 further receives, as a signal around the internal combustion engine 22, a rotation rate of the internal combustion engine 22 from a crank position sensor 66. The control unit 32 also receives an amount of sucked air of the intake passage 24 from an air flow meter 68. The control unit 32 further receives a rotation rate from a rotation rate sensor 70 of the rotary electric machine (not shown) of the vehicle. The rotary electric machine may be a motor/generator (MG1) which can be used as a power generator or a motor/generator (MG2), and which can be provided in a so-called hybrid vehicle and mainly used as a drive source.

The control unit 32 also receives a vehicle speed from a speed sensor 72, and receives, from a controller 76 of an air-conditioning blower motor (not shown), a rotation rate of a blower motor. The control unit 32 further receives an audio sound volume from an audio system 78 of the vehicle.

In addition, the control unit 32 receives vehicle interior noise [dB] from a highly directional microphone 79 such as an audio recognition microphone of a navigation system provided in the vehicle interior.

Figure 2:
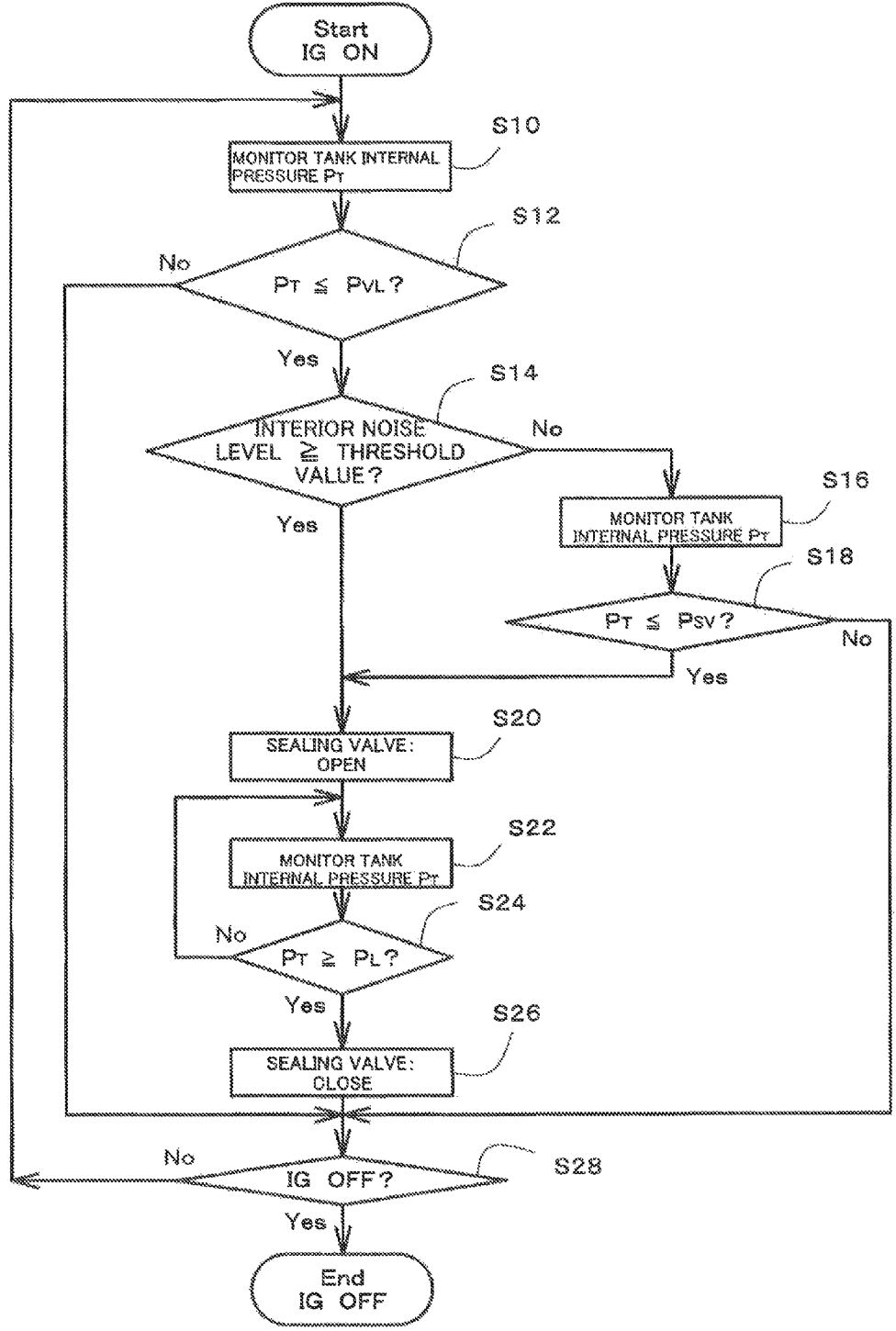
FIG. 2 is a flowchart for explaining the flow of pressure increasing control based on an interior noise level according to a present embodiment.

FIG. 2 illustrates a flowchart of the pressure increasing control performed by the control unit 32. When an ignition switch of the vehicle is turned on, the control unit 32 (ECU) can be actuated to start the present flowchart. As an initial condition, supply of electric current to the sealing valve 28, the purge valve 30, and the switching valve 62 may be blocked. Thus, the sealing valve 28 and the purge valve 30 may be in a closed state, and the switching valve 62 places the normal pipe 61 in a communicating state.

The control unit 32 monitors the tank internal pressure $P_T$ (tank pressure) via the tank internal pressure sensor 34 (S10). The control unit 32 further determines whether or not the tank internal pressure $P_T$ obtained from the tank internal pressure sensor 34 is equal to or lower than the pressure increasing control determination pressure $P_{VL}$ (S12).

If the tank internal pressure $P_T$ is over the pressure increasing control determination pressure $P_{VL}$, confirming no possibility of the vapor lock, the control unit 32 further determines whether or not the ignition switch is off (S28). If the ignition switch is in on, the control unit 32 does not perform the pressure increasing control and continues to monitor the tank internal pressure $P_T$ (S10 and S12). If the tank internal pressure $P_T$ is equal to or lower than the pressure increasing control determination pressure $P_{VL}$, as there is a possibility of the vapor lock, the control unit 32 determines whether or not to perform the pressure increasing control. Specifically, the control unit 32 determines whether or not the interior noise level is equal to or greater than a predetermined threshold value (S14).

The interior noise level is a parameter of the sound volume, and can be in decibels [dB], for example, and can be obtained from the highly directional microphone 79 described above. The threshold value of the interior noise level is set to a value which is equal to or greater than the sound volume [dB](where [dB] is greater than zero) obtained when the working noise generated with opening and closing of the sealing valve 28 reaches the vehicle interior. The threshold value can be acquired in advance.

If the interior noise level is equal to or greater than the threshold value in step S14, the control unit 32 operates (opens or closes) the sealing valve 28 for the pressure increasing control. The control unit 32 first transmits an opening instruction to the sealing valve 28 which is in a closed state (S20). For this purpose, the control unit 32 can supply an energizing current to the sealing valve 28 for energizing the coil of the solenoid valve, for example.

The control unit 32 further monitors the internal pressure $P_T$ of the fuel tank 14 through the tank internal pressure sensor 34 (S22) to determine whether or not the internal pressure $P_T$ increases to reach a value which is equal to or greater than the lower limit value $P_L$ of the normal negative pressure region (S24). If the internal pressure $P_T$ is below the lower limit value $P_L$ of the normal negative pressure region, the control unit 32 continues to monitor the internal pressure $P_T$ while maintaining the open state of the sealing valve 28 (S22). If the internal pressure $P_T$ is equal to or greater than the lower limit value $P_L$ of the normal negative pressure region, the control unit 32 transmits a closing instruction to the sealing valve 28 (S26). For this purpose, the control unit 32 can stop supply of the energizing current to the solenoid valve serving as the sealing valve 28, thereby closing the sealing valve 28. Thereafter, the control unit 32 can determine whether or not the ignition switch is in off (S28). If the ignition switch is on, the control unit 32 continues monitoring the internal pressure $P_T$(S10). If the ignition switch is off, the control unit 32 terminates this flow.

In step S14, if the interior noise level is less than the predetermined threshold value, the control unit 32 monitors the tank internal pressure $P_T$ (S16) to determine whether or not the tank internal pressure $P_T$ is equal to or lower than the saturated vapor pressure $P_{SV}$ of the fuel (S18). If the tank internal pressure $P_T$ is equal to or lower than the fuel saturated vapor pressure $P_{SV}$, in order to eliminate the flash boiling state of the fuel tank 14 immediately, the control unit 32, regardless the interior noise level, can transmit an opening instruction to the sealing valve 28 in a closed state (S20). If the tank internal pressure $P_T$ exceeds the fuel saturated vapor pressure $P_{SV}$ in step S18, the control unit 32 determines whether or not the ignition switch is off (S28). If the ignition switch is on, the control unit 32 continues to monitor the tank internal pressure $P_T$ and the interior noise level (S10→S12→S14), and reserves execution of the pressure increasing control until the vehicle interior temperature level is equal to or higher than the threshold value. If the ignition switch is off, on the other hand, the present flow is terminated.

As described above, in the pressure increasing control according to the present embodiment, the sealing valve 28 can be operated (opened or closed) based on the determination of the interior noise level. The working noise generated with opening and closing of the sealing valve 28 can be masked by the vehicle interior noise. This can prevent transmission of the working noise to a passenger to thereby eliminate deterioration of the noise characteristic.

With the pressure increasing control according to the present embodiment, the fuel tank 14 is allowed to communicate with the air, to thereby raise the internal pressure $P_T$ of the fuel tank 14 from a state of the pressure increasing control determination pressure $P_{VL}$ or lower, which is an excessive negative pressure, to the lower limit value $P_L$ of the normal negative pressure region or higher, which is a low negative pressure. As the lower limit value $P_L$ of the normal negative pressure region, which is a target value, is a negative pressure, upon communication of the fuel tank 14 with the air, the internal pressure of the fuel tank 14 can rise to the lower limit value $P_L$ of the normal negative pressure region.

According to the present embodiment, as the time taken between the opening of the sealing valve 28 and the closing of the sealing valve 28 may be extremely short, the result of the interior noise level determination when opening the sealing valve 28 can also be used for the determination when closing the sealing valve 28 so as to omit the determination of the interior noise level when closing the sealing valve 28. This can lead to simplification of the control flow. However, in order to reduce the noise characteristic more precisely, an interior noise level determination, which is similar to that performed in step S14, may be performed when closing the sealing valve 28.

While, in order to determine the interior noise level, the interior noise level may be measured directly with the highly directional microphone 79 provided in the vehicle interior and transmitted to the control unit 32 as described above, it is also possible to determine the interior noise level indirectly from the driving status of various devices functioning as noise sources.

The interior noise source can include, for example, a sound volume of an audio system, an air conditioner noise, and the like. The control unit 32 may therefore refer to a set volume of the audio system 78 to determine that the interior noise level is equal to or greater than the threshold value if the audio system volume is equal to or greater than the predetermined value. Alternatively, the control unit 32 may refer to the set rotation rate of the air conditioning blower motor by the air conditioner controller 76, to determine that the interior noise level is equal to or greater than the threshold value if the rotation rate is equal to or greater than a predetermined value. The correlation between the rotation rate of the blower motor and the interior noise level may be previously obtained by a sensory evaluation, the highly directional microphone 79, and the like.

Other sources of the interior noise may include engine noise. The control unit 32 may therefore refer to the rotation rate of the internal combustion engine 22 measured by the crank position sensor 66, to determine that the interior noise level is equal to or greater than the threshold value if the rotation rate is equal to or greater than a predetermined value greater than, for example, zero rotations per minute (>0 [rpm]). Alternatively, as the parameter which is linked with the rotation rate of the internal combustion engine 22 includes the amount of sucked air in the intake passage 24, the control unit 32 may determine that the interior noise level is equal to or greater than the threshold value if the amount of sucked air measured by the air flow meter 68 is equal to or greater than a predetermined value greater than, for example, zero cubic meters per second (>0[m$^3$/sec]). For these determination operations, the correlation between the rotation rate of the internal combustion engine 22 or the amount of sucked air, and the interior noise level by a sensory evaluation, the highly directional microphone 79, and the like, may be previously obtained.

Along with the engine noise, motor noise can be a source of the interior noise. The control unit 32 may therefore refer to the rotation rate of the rotary electric machine measured by the rotation rate sensor 70, to determine that the interior noise level is equal to or greater than the threshold value when the rotation rate is equal to or higher than a predetermined value (>0 [rpm]). For this determination operation, the correlation between the rotation rate of the rotary electric machine and the interior noise level by a sensory evaluation, highly directional microphone 79, and the like, may be previously obtained.

Another source of the interior noise may include road noise generated during driving on the road. The control unit 32 may therefore refer to the vehicle speed measured by the speed sensor 72, to determine that the interior noise level is equal to or greater than the threshold value when the vehicle speed is equal to or greater than a predetermined value. In consideration of both forward traveling and backward traveling, a non-zero value, that is, a selected positive or negative value, may be set as the predetermined value of the vehicle speed. For this determination operation, the correlation between the vehicle speed and the interior noise level by a sensory evaluation, highly directional microphone 79, and the like, may be previously obtained.

Figure 3:
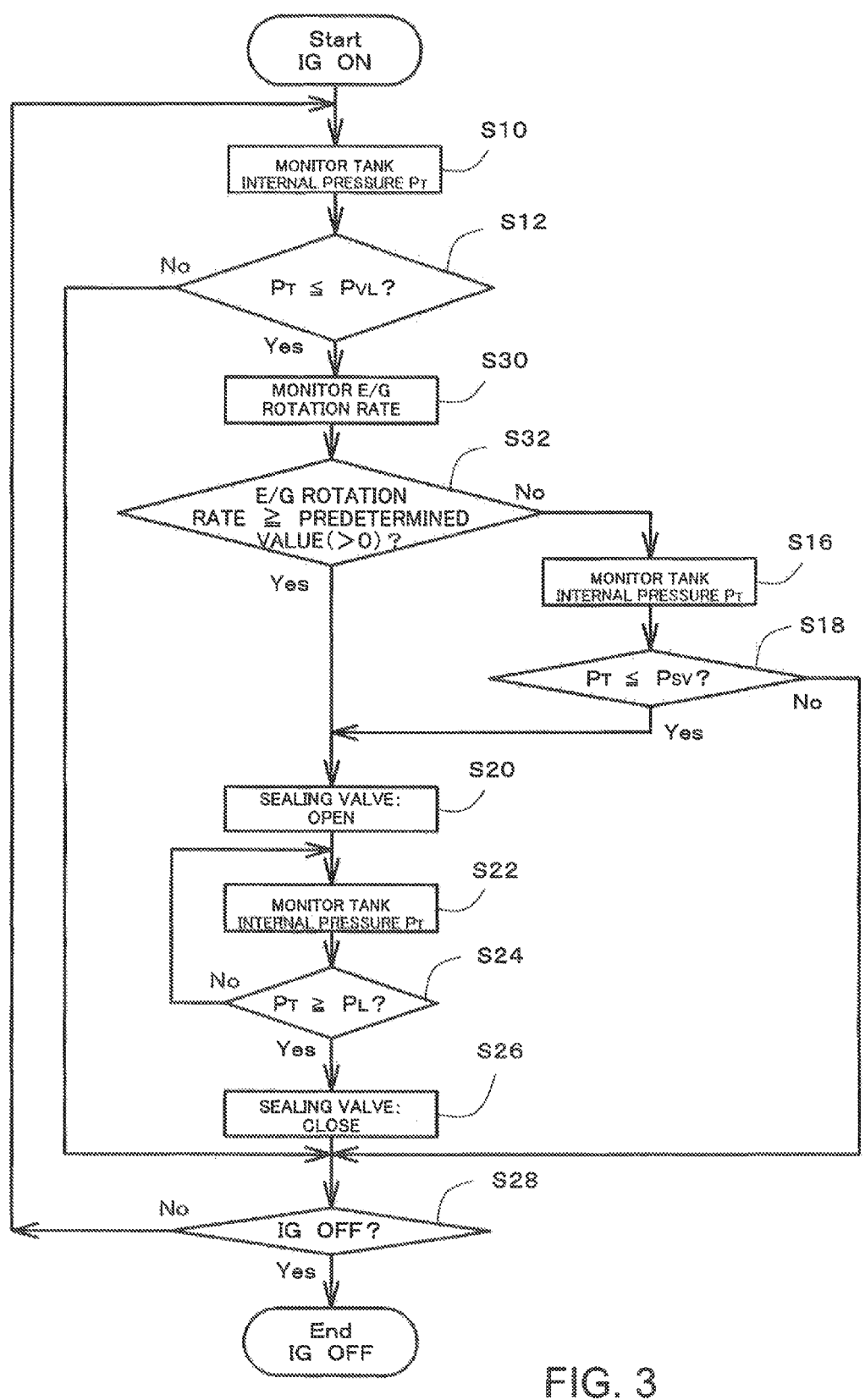
FIG. 3 is a flowchart for explaining the flow of pressure increasing control based on a rotation rate of an internal combustion engine according to a present embodiment.

FIG. 3 illustrates a flowchart of the pressure increasing control performed by the control unit 32 when the engine noise of the internal combustion engine 22 is selected as a source of the interior noise, and FIG. 4 illustrates a time chart in this case. In this example, so-called cranking noise, which can be caused when starting the internal combustion engine 22 in a stop state (rotation rate is 0), is utilized. In the flowchart illustrated in FIG. 3, steps S30 and S32 are inserted in place of step S14 in the flowchart of FIG. 2, while the remaining steps are the same as those in FIG. 2.

Referring to FIG. 4, in the stage prior to turning the ignition switch of the vehicle on, the internal pressure $P_T$ of the fuel tank 14 may lower with lowering of the outside-air temperature and the like. Thereafter, when the ignition switch is turned on at time t0, the control unit 32 starts monitoring the internal pressure $P_T$ of the fuel tank 14(S10→S12 in FIG. 3). In the example illustrated in FIG. 4, after the ignition switch is turned on, the driving mode of the vehicle is set to an EV driving mode in which the vehicle is driven only by the rotary electric machine. After the time t0, the control unit 32 monitors the internal pressure $P_T$ of the fuel tank 14 (S12→S28→S10 of FIG. 3).

Even during a driving mode which involves no fuel consumption, such as the EV driving mode, if the vehicle is located in a low-temperature environment such as in a cold district, the internal pressure $P_T$ of the fuel tank 14 may continue to lower after the time t0 in FIG. 4. When the internal pressure $P_T$ of the fuel tank 14 lowers to the pressure increasing control determination pressure $P_{VL}$ at time t1, the control unit 32 obtains a measured value from the crank position sensor 66 and monitors the rotation rate of the internal combustion engine 22 (S30). In the example illustrated in FIG. 4, the internal combustion engine 22 is stopped at time t1, and therefore the rotation rate is 0 (less than predetermined value $rpm_{th}$). Accordingly, the pressure increasing control will not be executed (S32→S16). At this time, as the tank internal pressure $P_T$ exceeds the fuel saturated vapor pressure $P_{SV}$, compulsory execution of the pressure increasing control is also avoided (S16→S18→S20). Further, as the vehicle is traveling, that is, as the ignition switch is in an on state, the control unit 32 continues to monitor the internal pressure $P_T$ of the fuel tank 14 and the rotation rate of the internal combustion engine 22(S16→S18→S28→S10→S12→S30→S32→S16).

At time t2 in FIG. 4, the driving mode of the vehicle is changed from the EV driving mode to an HV driving mode which involves driving of the internal combustion engine 22. At this time, the internal combustion engine 22 is cranked, and thereafter at time t3, the rotation rate of the internal combustion engine 22 is equal to or greater than the predetermined value $rpm_{th}$. The predetermined value $rpm_{th}$ can be correlated with the interior noise level, and when the rotation rate of the internal combustion engine 22 reaches the predetermined value $rpm_{th}$, the interior noise level also becomes equal to or greater than the threshold value Th. At this time, the control unit 32 transmits an opening instruction to the sealing valve 28 in a closed state (S20). Thus, the working noise generated with the operation (opening or closing) of the sealing valve 28 can be masked by the cranking noise.

The control unit 32 further monitors the internal pressure $P_T$ of the fuel tank 14 via the tank internal pressure sensor 34(S22), and determines whether or not the internal pressure $P_T$ rises to a value which is equal to or greater than the lower limit value $P_L$ of the normal negative pressure region (S24). When the internal pressure $P_T$ reaches the lower limit value $P_L$ of the normal negative pressure region or higher at time t4, the control unit 32 transmits a closing instruction to the sealing valve 28 (S26). Thereafter, the control operation flow similar to the flow in FIG. 2 will be executed.

Figure 5:
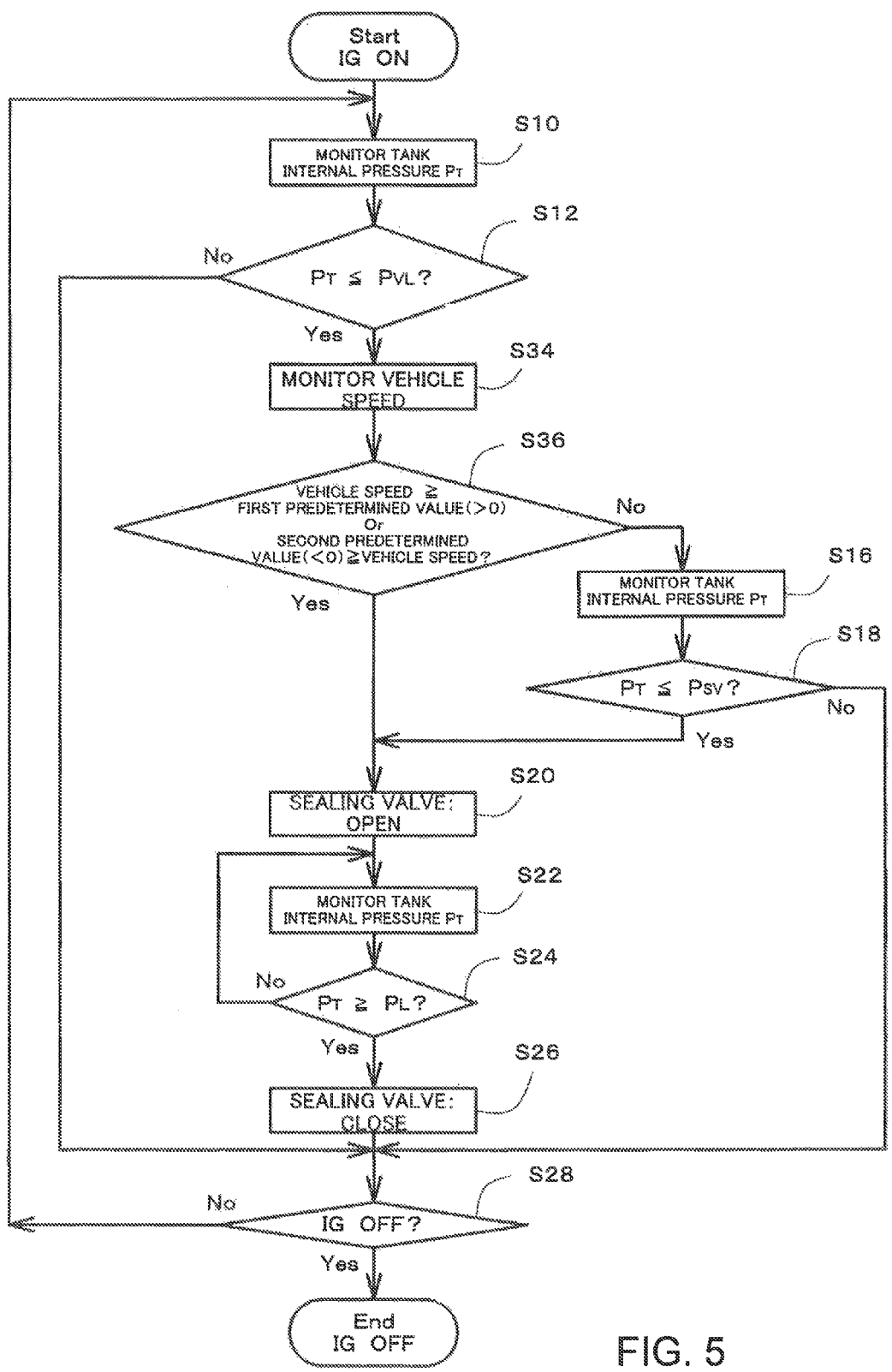
FIG. 5 is a flowchart for explaining the flow of pressure increasing control based on a vehicle speed according to a present embodiment.
Figure 6:
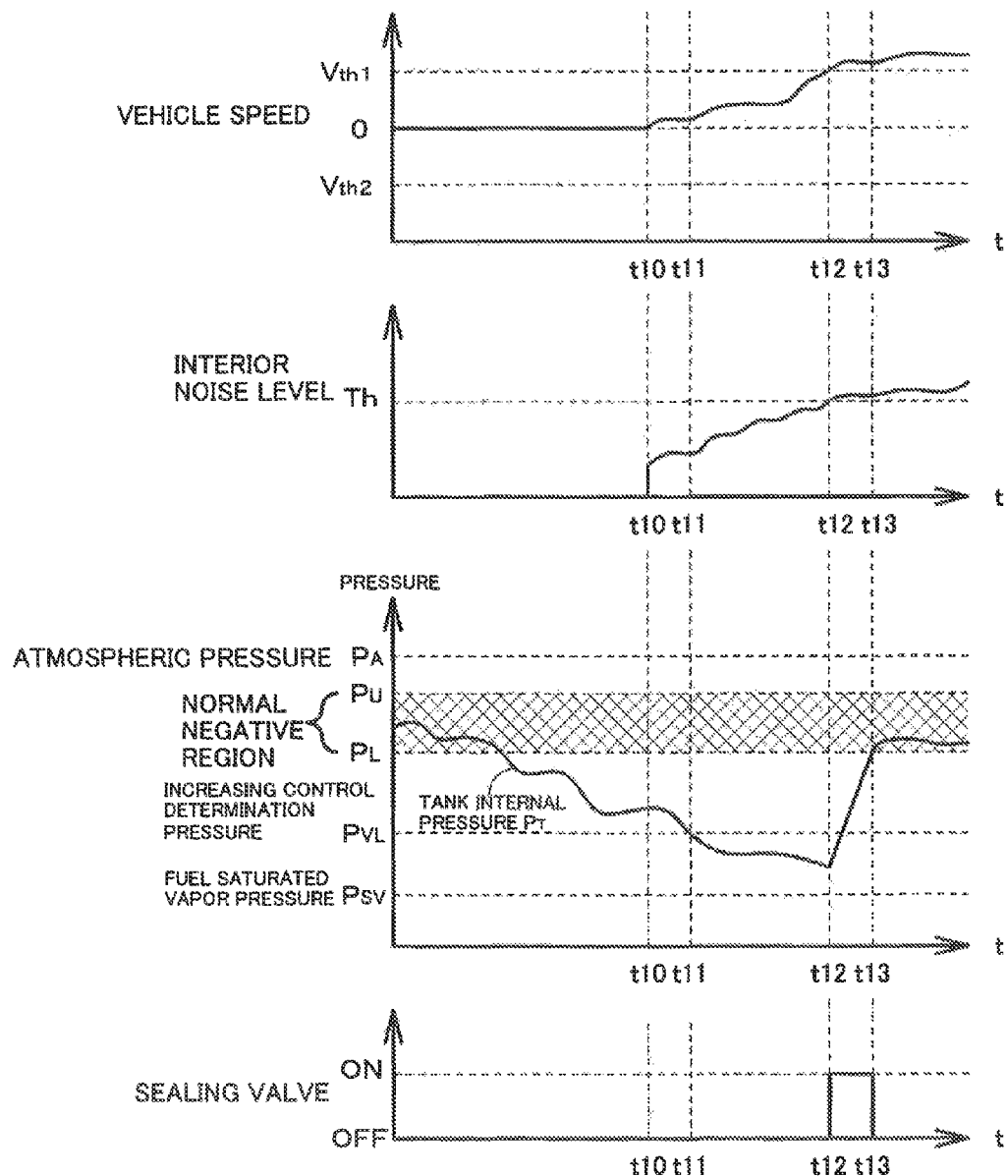
FIG. 6 is a time chart for explaining pressure increasing control based on a vehicle speed in accordance with a present embodiment.

FIG. 5 illustrates a flowchart of the pressure increasing control performed by the control unit 32 when the road noise of the vehicle is selected as a source of the interior noise, and FIG. 6 illustrates a time chart in this case. In the flowchart illustrated in FIG. 5, steps S34 and S36 are inserted in place of step S14 in the flowchart of FIG. 2, while the remaining steps in FIG. 5 are the same as the steps in FIG. 2. In the time chart illustrated in FIG. 6, the first predetermined value $V_{th1}$ and the second predetermined value $V_{th2}$ of the vehicle speed may be correlated to the interior noise level, so that when the vehicle speed reaches the first predetermined value $V_{th1}$ or the second predetermined value $V_{th2}$, the interior noise level also becomes equal to or greater than the threshold value Th.

Referring to FIG. 6, in the stage prior to turning the ignition switch of the vehicle on, the internal pressure $P_T$ of the fuel tank 14 lowers with lowering of the outside-air temperature. Thereafter, when the ignition switch is turned on at time t10, the control unit 32 starts monitoring the internal pressure $P_T$ of the fuel tank 14(S10→S12 in FIG. 5). In the example illustrated in FIG. 6, as in the example illustrated in FIG. 4, after the ignition switch is turned on, the driving mode of the vehicle is set to the EV driving mode. After the time t10, the control unit 32 monitors the internal pressure $P_T$ of the fuel tank 14 (S12→S28→S10 in FIG. 5).

Even during the driving mode which involves no fuel consumption, such as the EV driving mode, if the vehicle is located in a low-temperature environment such as in a cold district, the internal pressure $P_T$ of the fuel tank 14 may continue to lower after the time t10 in FIG. 6. When the internal pressure $P_T$ of the fuel tank 14 lowers to the pressure increasing control determination pressure $P_{VL}$ at time t11 in FIG. 6, the control unit 32 obtains a measured value from the speed sensor 72 and monitors the vehicle speed (S34). In the example illustrated in FIG. 6, at time t11, the vehicle speed is closer to 0 than to either the first predetermined value $V_{th1}$ or the second predetermined value $V_{th2}$, and therefore does not satisfy the opening condition for sealing valve 28. At this time, as the tank internal pressure $P_T$ exceeds the fuel saturated vapor pressure $P_{SV}$, compulsory execution of the pressure increasing control is avoided (S18→S20). Further, as the vehicle is traveling, that is, as the ignition switch is in an on state, the control unit 32 continues to monitor the internal pressure $P_T$ of the fuel tank 14 and the rotation rate of the internal combustion engine 22 (S16→S18→S28→S10→S12→S34→S36→S16).

At time t12 in FIG. 6, when the vehicle speed reaches the first predetermined value $V_{th1}$, the interior noise level becomes the threshold value Th or greater, and the control unit 32 transmits an opening instruction to the sealing valve 28 in a closed state (S20). Thus, the working noise generated with the operation (opening or closing) of the sealing valve 28 can be masked by the road noise.

The control unit 32 further monitors the internal pressure $P_T$ of the fuel tank 14 via the tank internal pressure sensor 34 (S22), and determines whether or not the internal pressure $P_T$ rises to a value which is equal to or greater than the lower limit value $P_L$ of the normal negative pressure region (S24). When the internal pressure $P_T$ reaches the lower limit value $P_L$ of the normal negative pressure region or higher at time t13, the control unit 32 transmits a closing instruction to the sealing valve 28 (S26). Thereafter, the control operation flow similar to the flow in FIG. 2 will be executed.

Embodiments in which determination of the interior noise level is performed based on the rotation rate of the internal combustion engine 22 may simplify the system structure of the pressure control apparatus 10. More specifically, in the pressure reducing control described above, the control is executed based on the precondition that the intake passage 24 has a negative pressure, that is, the internal combustion engine 22 is being driven. The driving state of the internal combustion engine 22 is a subject of monitoring in the pressure reducing control. Therefore, if the interior noise level is determined based on the rotation rate of internal combustion engine 22 in the pressure increasing control, it is possible to determine whether or not the pressure increasing control can be executed without increasing the number of subjects of measurement in addition to that for the conventional pressure control apparatus 10.

Determination of the interior noise level based on the sound source other than the internal combustion engine 22 (i.e., the sound volume of audio system, the rotation rate of the blower motor, the rotation rate of the rotary electric machine, the vehicle speed), the engine stall of the internal combustion engine 22 caused by vapor lock can be reliably avoided. As described above, the pressure increasing control can be performed in order to avoid the vapor lock caused by flash boiling of the fuel. The vapor lock may hinder supply of the fuel from the fuel pump 36 to the internal combustion engine 22, which may result in engine stall of the internal combustion engine 22.

In the pressure increasing control according to the present embodiment, as execution of the pressure increasing control may be deferred until the interior noise level becomes the threshold value or greater, there is a possibility that the internal pressure of the fuel tank 14 will gradually approach the saturated vapor pressure $P_{SV}$ of the fuel during this time. Therefore, the control flow which uses driving of other devices as a criterion for determining execution of the control may reliably avoid engine stall of the internal combustion engine 22.

While, in the embodiments described above, the interior noise level may he determined based on the individual interior noise sources, the present disclosure is not limited to this example. The determination of the interior noise level may be performed based, for example, on a sum of the volume of the interior noise sources described above. Specifically, it is possible to prestore the interior noise levels corresponding to the rotation rate of the internal combustion engine 22, the rotation rate of the rotary electric machine, the vehicle speed, the rotation rate of the air conditioner blower motor, and the sound volume of the audio system, respectively, in a map or the like, and operate (open or close) the sealing valve 28 when the sum of these interior noise levels is equal to or greater than the threshold value of the interior noise level, as examples.

While embodiments of the present disclosure have been described using specific terms, such description is for illustrative purposes only, and it is to be understood that changes and variations may be made without departing from the spirit or scope of the appended claims.

The invention claimed is:

1. A pressure control apparatus of a vehicle fuel tank, comprising:
   an air introduction passage having a first end connected to the fuel tank and a second end opened to outside air;
   a sealing valve configured to open and close the air introduction passage;
   a controller configured to control an opening and closing operation of the sealing valve;
   a pressure sensor configured to detect a pressure within the fuel tank and send a result of detection to the controller; and
   a blower controller configured to detect a rotation rate of an air conditioning blower motor of the vehicle and transmit a result of detection to the controller,
   wherein the controller opens the sealing valve from a closed state to raise the pressure of the fuel tank to a pressure in a normal negative pressure region which is higher than a predetermined negative pressure when the pressure of the fuel tank is below the predetermined negative pressure and the rotation rate of the air conditioning blower motor is equal to or greater than a threshold value.

2. A pressure control apparatus of a vehicle fuel tank, comprising:
   an air introduction passage having a first end connected to the fuel tank and a second end opened to outside air;
   a sealing valve configured to open and close the air introduction passage;
   a controller configured to control an opening and closing operation of the sealing valve;
   a pressure sensor configured to detect a pressure within the fuel tank and send a result of detection to the controller; and
   an audio system configured to detect an audio sound volume of the vehicle and transmit a result of detection to the controller,
   wherein the controller opens the sealing valve from a closed state to raise the pressure of the fuel tank to a pressure in a normal negative pressure region which is higher than a predetermined negative pressure when the pressure of the fuel tank is below the predetermined negative pressure and the audio sound volume is equal to or greater than a threshold value.

* * * * *